May 21, 1968 K. STAHL ET AL 3,384,879

DIODE-MATRIX DEVICE FOR DATA STORING AND TRANSLATING PURPOSES

Filed March 12, 1965 2 Sheets-Sheet 1

Inventors

Karl Stahl
Ruth Vogel
Jürgen Langer
Hans Kielgas

May 21, 1968 K. STAHL ET AL 3,384,879

DIODE-MATRIX DEVICE FOR DATA STORING AND TRANSLATING PURPOSES

Filed March 12, 1965 2 Sheets-Sheet 2

Inventors

Kurt Stahl

Rudi Vogel

Jürgen Langer

Hans Kielgas

United States Patent Office 3,384,879
Patented May 21, 1968

3,384,879

DIODE-MATRIX DEVICE FOR DATA STORING AND TRANSLATING PURPOSES

Kurt Stahl, Hohensachsen, and Ruth Vogel, Jürgen Langer, and Hans Kielgas, Mannheim, Germany, assignors to Brown, Boveri & Cie, Aktiengesellschaft, Mannheim-Kafertal, Germany, a German corporation Filed Mar. 12, 1965, Ser. No. 439,381
Claims priority, application Germany, Mar. 13, 1964, B 75,886; Mar. 14, 1964, B 75,912
14 Claims. (Cl. 340—173)

ABSTRACT OF THE DISCLOSURE

Diode-matrix for data processing includes an insulating substrate having a surface area, a number of diodes distributed in matrix arrangement on the area, the diodes having respective controllable connector means for selectively controlling the individual diodes to be active and inactive respectively in the matrix arrangement, the connector means being electrically in series with the respective diodes and either having each a locality of constricted cross section to permit evaporating the constricted locality by a current surge or comprising each of a photosensitive resistor on the substrate area controllable by illumination, whereby the connection with the diode is severable to inactivate the diode, the entire matrix arrangement including the diodes and the connector means being deposited and joined on the substrate.

Our invention relates to solid-state matrices of diodes for information storing or translating purposes, the information content of each individual matrix device being determined by which particular diodes in the matrix are made active or inactive. In known devices of this type, the entering of a given information content is effected by inserting the respective diodes, for example as plugs, into the particular localities of the matrix.

It is an object of our invention to devise diode-matrix devices for data processing purposes which occupy much less space, require considerably less material, and are less costly in manufacture.

According to the invention, the matrix device is composed of diodes and of controllable connector means with the aid of which individual diodes can be switched on or off or be made active or inactive, depending upon the requirements of the particular information content to be stored or translated, the entire matrix arrangement of diodes and controllable connector means being deposited as an area-type structure upon the surface of an insulating substrate, for example by vapor deposition or other epitaxial precipitation, if necessary followed by etching, oxidizing and the application of other techniques known in the production of solid-state and microcircuit components.

Such devices according to the invention occupy considerably less space than the known diode-matrix devices and since all of the diodes and all of the connector means of the matrix are jointly and simultaneously deposited the manufacture is simplified and made more economical.

Diode-matrix devices according to the invention are produced as follows. Employed is an insulating carrier such as a pane of glass or some other material, such as a crystalline semiconductor slab having an oxidized surface, which serves as a substrate for the entire matrix. An arrangement of preferably parallel strips, to form the "columns" of the matrix, is deposited on the insulating substrate surface. The strips consist of a metal upon which a dense coating of oxide can be produced, such oxide layers being essential for obtaining the desired rectifying action. Suitable for such purposes, for example, are strips of titanium. The strips are deposited by vapor deposition. However, other ways of deposition are likewise applicable. For example, the entire surface may first be coated with the metal, and the intermediate areas subsequently may be etched away in the manner known from the production of printed circuits. The metal strips thus deposited are anodically oxidized.

Thereafter a second metal is vapor deposited at those mutually spaced localities of each strip at which a diode is to be formed. For obtaining rectifying action, it is preferable to employ a metal having a high work function in comparison with the above-mentioned parallel strips. Well suitable as the second metal is platinum, for example. The desired shape of the diode spots is readily confined during the vaporization process by use of masking.

The so-called "lines" of the matrix which extend transverse to the columns thus intersecting each of them, and which are insulated from the columns, are preferably produced likewise by vapor deposition. One way of doing this is to vapor deposit the lines in the same processing step employed for vapor deposition of the platinum used for the diodes, if platinum is also employed as metal for the lines. Prior to deposition of the line metal, the insulation of the columns from the lines at the intersection points should be made more reliable by depositing additional insulating layers at these intersection localities. One way of doing this is to augment the oxidation of the columns at the intersection points. However, the additional insulation may also be provided by depositing a layer of varnish or by vaporizing an insulating coating upon the intersection localities of the columns before the vapor deposition of the line metal is commenced.

The effective electrical connection between the diodes thus formed, and the lines at the respective intersection points correlated to the diodes, is subsequently made or not made, as the case may be, by the above-mentioned controllable means. According to a more specific feature of the invention, the respective controllable connector means for the respective diodes are designed as conductors which are series-connected with the respective diodes and which each comprise a locality of greatly reduced cross section. This constricted locality is subsequently evaporated by a current surge if the particular diode is to be switched off, so that then the electrical connection from the column through the diode to the line is interrupted at this particular intersection point of the matrix. Preferably the series conductors just mentioned are likewise vapor deposited with the aid of corresponding masks.

The control means for selectively placing the diodes in active or inactive condition may also consist of contacts deposited upon the insulating substrate plate and suitable for coaction with external contact means which are engageable with the contact localities on the substrate.

According to another fetaure of the invention, the control means which determine whether selected diodes are active or inactive on the substrate, are designed as photo-responsive resistors deposited upon the substrate surface, the deposition being preferably also effected by vaporization. The desired geometric shape of the photo-resistors is fixed in known maner by the use of masks through which the vapor deposition is effected. An additional diode matrix is often needed for controlling the memory matrix proper. Heretofore, the additional matrix had to be wired thus requiring a considerable amount of material and work for providing the connecting leads. According to another feature of our invention, the additional diode matrix is produced in the same production process and on the same insulating substrate as the memory matrix, using the same production process for both.

The connections between the two memory matrices may be deposited simultaneously.

It is advisable to provide the completed matrix device with an insulating coating for protection from moisture and mechanical damage, for example when shoving a punch card upon the device. Of course, the connecting contacts usually provided along the margin of the matrix, and in some cases also the contacts associated with the respective diodes for coaction with external contacts, must be left bare by such a coating.

The invention will be further described with reference to embodiments illustrated by way of example on the accompanying drawings, in which.

The same reference characters are applied in the various illustrations for denoting corresponding elements respectively.

Figure 1:
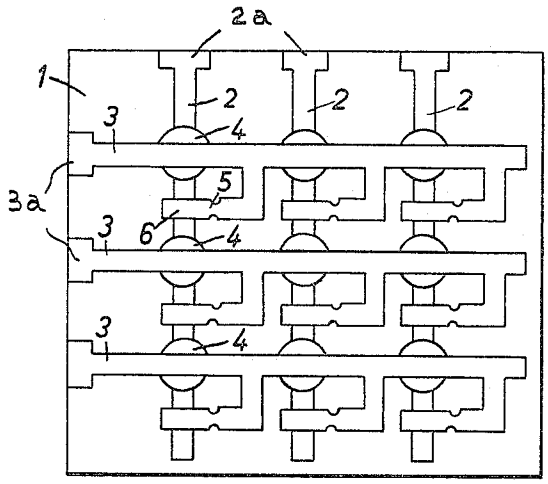
FIGS. 1 and 2 show respective plan views, on greatly enlarged scale, of two different matrix devices according to the invention.

The device shown in FIG. 1 comprises an insulating substrate 1 consisting, for example, of a glass pane. Deposited directly upon the surface of the substrate are a number of parallel columns consisting of titanium strips. The ends of the strips are widened to form terminal portions 2*a* for external contact connections. Deposited on top of the columns 2 are lines 3 of platinum which are parallel to each other and extend at a right angle to the columns. The lines 3 also have broadened terminal portions 3*a* for connection of the matrix to external circuitry. At the individual intersection points between the lines 3 and the columns 2, the columns 2 carry insulating layers 4. The lines 3 have respective lateral extensions which connect the lines with respective diodes 6 and are provided with a constriction 5. The surface of the columns 2 is oxidized at least beneath each diode 6 to secure the desired rectifying effect. That is, the oxide layer and the adjacent respective metals of the column and the line jointly constitute the diode.

As shown, the insulating layers 4 between the columns 2 and the lines 3 may have shape of circular spots. If desired, however, the entire surface of each column may be oxidized, and the oxide coating may then be increased in thickness at the intersection localities prior to depositing the lines 3, to secure complete insulation. As described above, the metal columns and strips are preferably deposited by vapor deposition with the aid of correspondingly shaped masks. The lines 3 with the extensions serving as controllable connectors and containing the constrictions 5, which connectors also form the top electrodes of the diodes 6, may all be produced of the same material, preferably platinum. However, it suffices if only the diode region 6 consists of this metal and subsequently the lines 3 with the connector extension and the constrictions 5 are vapor described from other metals such as copper or silver.

At the desired intersection points, the constrictions 5 are evaporated by passing a current surge through the connector, thus entering the information content into the matrix. This, like the production process for the entire matrix, may be effected in a processing stage common to all of the constrictions to be interrupted. One way of doing this is to place upon the matrix a stencil equipped with contacts which impress a voltage at the particular intersection points between the line 3 and the upper electrode of the diode 6, thus heating the constrictions 5 at this locality to the vaporization temperaure.

As described above, the matrix device is produced with the aid of conjoint and simultaneous production steps for all of the diodes and all of the controllable connector means. Analogously, the entering of information for storing or translating purposes, that is the selective actuation of the corresponding controllable connector means, may also be effected simultaneously by a common process. This is preferably done by selecting the connector means to be controlled and consequently the diodes, with the aid of a punch card shoved upon the matrix on the substrate. If the matrix, as described, is equipped with contacts, the control is effected by mechanical contact engagement through the punched holes of the card. In this case, brush contacts, grouped together on a contact bar for each column or line of the matrix may be provided. In effect, each of the brush-contact bars then performs the function, for example, of a matrix line in that the brush contacts are capable of establishing an electrical contact engagement with all of the contacts of a matrix line. If then the punch card is shoved between the brush-contact bars and the matrix, the brush contacts engage the matrix contacts only at those localities where the card has holes, thus transferring the information from the punch card to the matrix.

All mechanical data-entering means, however, are avoided by providing the above-mentioned photo-resistors for electrically connecting the columns with the respective lines in series with the respective diodes at the intersection points of the matrix. Such photo-resistors may consist, for example, of cadmium sulphide. According to a preferred embodiment of the invention, these photo-resistors are activated by placing a punch card of opaque material, having a hole for each of the photo-resistors of the matrix device, on top of the matrix arrangement. Then the photo-resistors are illuminated through the selectively punched holes of the card preferably by means of a large-area source of light. This way of transferring the information content of the punched card to the matrix is particularly advantageous because it avoids all possibility of wear as well as any contacting trouble. Furthermore, the information content of the matrix can be changed as often as desired simply by exchanging the punch card. It is essential that with such card reading devices all of the photo-resistors or photo-diodes are uniformly illuminated. For that reason, the above-mentioned large-area light source preferably consists of an electro-luminescent plate. Also suitable is a transparent pane, for example of glass, synthetic plastic (Plexiglas or the like) which is matted on one side and illuminated from one or more of its edges. Preferably the pane is matted only at the spots where respective holes of the card may be located, and is otherwise silvered to form a mirror on all sides, with the only exception of the lateral edges where the light from the source is to enter through the pane.

Figure 2:
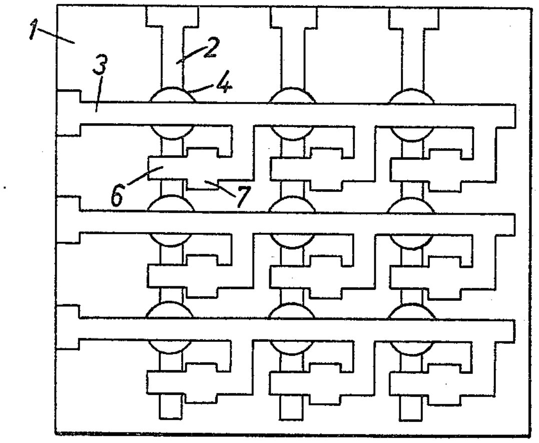
Figure 3:
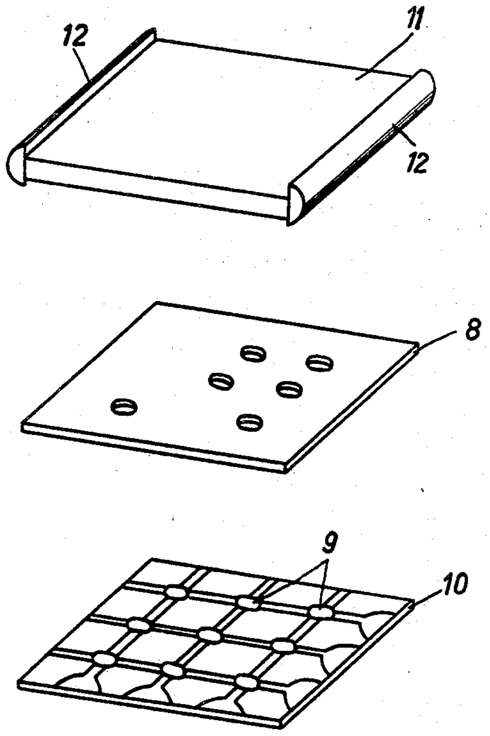
FIG. 3 shows another matrix device according to the invention together with an appertaining punch card and illuminating component, these parts being shown in exploded fashion.

The embodiments shown in FIGS. 2 and 3 embody the just-mentioned features.

In the preferred embodiment of a solid-state memory matrix according to FIG. 2, the above-mentioned constrictions 5 are substituted by respective photo-resistors 7 by means of which the individual connections between columns 2 and lines 3 through the respective diodes 6 may be reversibly closed and opened. For this purpose a punch card is placed upon the matrix, the card having holes selectively located at the places where the photo-resistors 7 are situated. The punch card is then uniformly illuminated from above for operating the resistors. The memory matrix according to FIG. 2, compared with one shown in FIG. 1, has the advantage that its information content can be changed as desired, simply by changing the punch card.

FIG. 3 shows an embodiment of a card-reading device of the just-mentioned type. The punch card 8, the substrate 10 with the photo-resistors 9, and the broad-area source of light 11 are shown spaced from each other, although in reality they are placed close to each other. A suitable guide, not illustrated, holds the substrate 10 and the light source 11 slightly spaced from each other and permits the punch card 8 to be shoved into the intermediate space and to be exchanged in this space for a differently punched card. The holes of the card 8 are located at selected intersection points of a rectangular matrix system mating that of the substrate. In the illustrated example, a maximum of nine holes may be provided, of which only six selected holes are used to represent a particular information content. The photo-diodes or photo-resistors 9 are arranged in accordance with the same rectangular matrix network as the holes on the card and are equal in number to the maximum of permissible hole locations. The current supply columns and lines are vapor deposited in form of the above-described matrix upon the surface of the insulating substrate. The light source 11 is constituted, for example, by a glass pane which is silvered and consequently converted to a mirror on all sides, having transparent or matted spots only at the localities of the nine possible holes and at the light entrance edges. Two elongated lamps 12 are arranged along these two edges and are fastened to the pane 11.

Several illuminating panes for several card-reading devices may be served by a common light source, preferably through light conductors such as rods of glass or plastic. This results in a particularly space-saving arrangement, and the heat generated by all light sources originates at a single locality from which it can be more readily dissipated.

For reasons of reliability, it is desirable to provide the light source in duplicate and to arrange the sources in such a manner that when one light source fails, the device remains fully operative with the aid of the second light source. The failure of one light source may be signalled by a suitable device.

Figure 4:
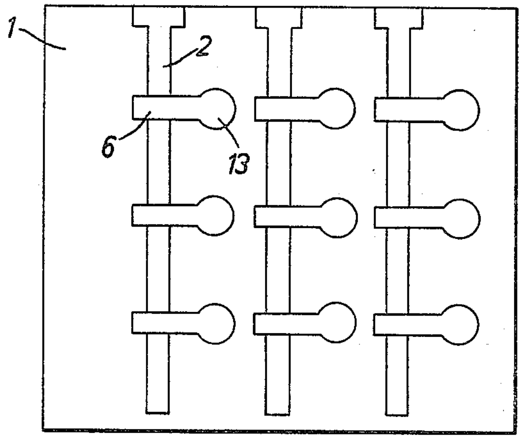
FIG. 4 shows a top view of still another matrix device.

As shown in FIG. 4, the matrix may also be provided with contacts 13 at the respective diodes 6. These contacts are then available for cooperation with external contacts as may, for example, enter through the selected holes of the punch card. With such a matrix device, the lines 3 according to FIGS. 1 and 2, may be omitted. They are substituted by having the external contacts, which cooperate with the contacts 13 of the matrix, mounted on conducting structures corresponding to the matrix lines. Preferably these external contact structures or lines are designed as brush-contact bars whose individual brush contacts pass through the hole of a punch card inserted between the brush bars and the matrix device proper.

It will be understood that the above-described embodiments are presented by way of example but are not intended to exhaustively represent the invention which may rather be given a variety of embodiments other than particularly illustrated herein, without departing from the essential features of the invention and within the scope of the claims annexed hereto.

We claim:

1. A diode-matrix device for data processing, comprising an insulating substrate having a surface area, a number of diodes distributed in matrix arrangement on said area, said diodes having respective controllable connector means for selectively controlling the individual diodes to be active and inactive respectively in said matrix arrangement, said connector means being electrically in series with said respective diodes and having a locality of constricted cross section to permit evaporating the constricted locality by a current surge to thereby sever the connection with said diode to inactivate the latter, said entire matrix arrangement including said diodes and said connector means being deposited and joined on said substrate.

2. In a diode-matrix device according to claim 1, said connector means comprising contacts on said substrate area, said contacts being adapted for mechanical engagement by external contact means.

3. A diode-matrix device according to claim 1, comprising a punch card mating said matrix when placed upon said substrate surface area and having selected holes through which said connector means are actuable.

4. A diode-matrix device according to claim 1, comprising an insulating coating which covers said entire matrix arrangement on said surface area of said substrate with the exception of localities to be externally contactable.

5. A diode-matrix device for data processing, comprising a flat insulating substrate plate having a substantially planar surface, parallel columns of conductor strips on said surface, a number of mutually spaced diodes formed on each of said strips and having transverse conductors on top, said strips and diodes and conductors forming jointly a matrix arrangement, said transverse conductors having means for selectively controlling the individual diodes to be active and inactive respectively in said matrix arrangement, said controlling means being a locality of a respective transverse conductor having a constricted cross section to permit evaporating the constricted locality by a current surge to thereby sever the connection with a respective diode to inactivate the latter, said entire matrix arrangement being produced on and integrated with said substrate.

6. A diode-matrix device for data processing, comprising an insulating substrate having a surface area, parallel columns of conductor strips on said area, parallel lines of metal extending transverse to said strips on said area and forming together with said strips a cross-bar matrix having a multiplicity of intersection localities, and diode-forming means between said strips and said metal lines at said respective intersection localities, and means on said substrate for selectively controlling the individual diodes to be active and inactive respectively, said controlling means being a locality of a respective transverse line having a constricted cross section to permit evaporating the constricted locality by a current surge to thereby sever the connection with a respective diode to inactivate the latter.

7. In a diode matrix device according to claim 6, said strips consisting of metal having a low work-function and said lines consisting of metal having a high work-function, said diode-forming means comprising insulating material between said strips and said lines at said intersection localities.

8. A diode-matrix device for data processing, comprising an insulating substrate having a surface area, parallel columns of conductor strips on said area, said strips consisting of metal and having a dense oxide coating, a number of diodes spaced from each other on top of each of said strips, said oxide coating of each strip forming an integral part of each of said diodes, and connector means for selectively controlling the individual diodes to be active and inactive respectively in said matrix arrangement, said connector means being electrically in series with said respective diodes and having each a locality of constricted cross section to permit evaporating the constricted locality by a current surge to thereby sever the connection with said diode to inactivate the latter, said strip and diodes forming a matrix deposited on and bonded to said substrate.

9. A diode-matrix device for data processing, comprising an insulating substrate having a surface area, parallel columns of conductor strips on said area, said strips consisting of metal and having an oxide coating, a number of deposits spaced from each other on top of each of said strips and consisting of metal having a higher work function than the metal of said strips whereby said oxide-coated strips and said deposits form a matrix of respective diodes, and connector means for selectively controlling the individual diodes to be active and inactive, respectively, in said matrix, said connector means being electrically in series with said respective diodes and having each a locality of constricted cross section to permit evaporating the constricted locality by a current surge to thereby sever the connection with said diode to inactivate the latter.

10. In a diode-matrix device according to claim 9, said strips consisting substantially of titanium and said metal deposits consisting substantially of platinum.

11. A diode-matrix device for data processing, comprising an insulating substrate having a surface area, a number of diodes distributed in matrix arrangement on said area, said diodes having respective controllable connector means for selectively controlling the individual diodes to be active and inactive respectively in said matrix arrangement, said entire matrix arrangement including said diodes and said connector means being deposited and joined on said substrate, said connector means comprising photosensitive resistors on said substrate area, said resistors being controllable by illumination.

12. A diode-matrix device according to claim 11, comprising an opaque punch card mating said matrix when placed upon said substrate surface area and having selected holes, and an area-type source of light for illuminating the photosensitive resistors that remain exposed through said holes.

13. In a diode-matrix device according to claim 12, said light source comprising a luminescent pane mating said punch card and adapted to be placed in face-to-face juxtaposition thereto.

14. In a diode-matrix device according to claim 12, said light source comprising a pane which is translucent at least at the localities of said photosensitive resistors and adapted to be placed in face-to-face relation to said card, and lamp means mounted along an edge of said pane.

References Cited

UNITED STATES PATENTS

| | | | |
|---|---|---|---|
| 2,766,509 | 10/1956 | Le Loup et al. | 317—234 |
| 3,245,051 | 4/1966 | Robb | 340—166 |
| 3,171,100 | 2/1965 | Rajchman | 340—173 |

BERNARD KONICK, *Primary Examiner.*

TERRELL W. FEARS, *Examiner.*

J. F. BREIMAYER, *Assistant Examiner.*